Aug. 12, 1958      A. C. HICKS      2,847,653
SAFETY ELECTRIC CONNECTION
Filed Dec. 19, 1955
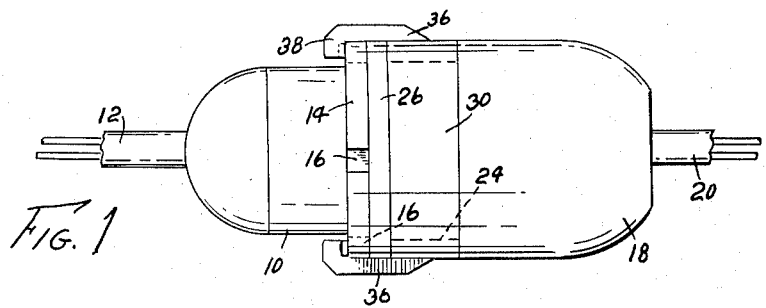
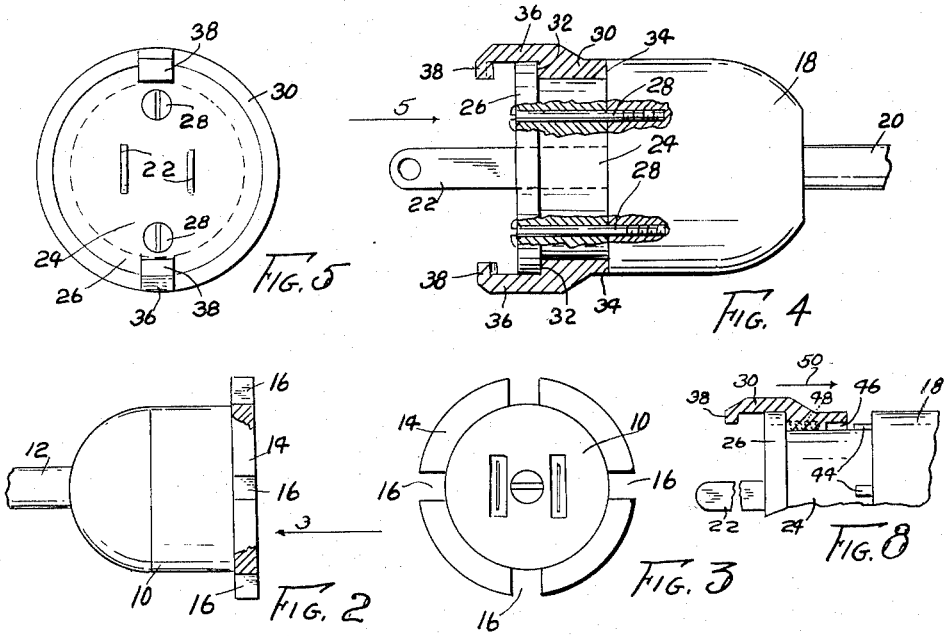
INVENTOR.
A. C. HICKS
BY

United States Patent Office 2,847,653
Patented Aug. 12, 1958

2,847,653

SAFETY ELECTRIC CONNECTION

Arthur Charles Hicks, Westminster, Mass.

Application December 19, 1955, Serial No. 554,061

2 Claims. (Cl. 339—91)

This invention relates to a safety electric power connection, the principal objects of the invention including the provision of a two-part, pronged and socketed electric connector having means for securing the same in substantially locked condition, so that the pronged portion will not become accidentally separated from the socketed portion thereof.

Other objects of the invention include the provision of a socketed connection part provided with a flange having notches therein, in combination with a pronged connection part provided with a rotary locking member having fingers thereon which cooperate with the notches of the flange on the socketed member and by a relative rotary motion thereof lock the socketed and pronged members together, whereby they will not become accidentally separated, but may be manually removed at any time upon proper reverse rotary motion of the locking member.

Other objects and advantages of the invention will appear hereinafter.

Reference is to be had to the accompanying drawings, in which:

Fig. 1 is a view in elevation illustrating the two members of the connection secured together;

Fig. 2 is a view in elevation of the socketed member;

Fig. 3 is a front view thereof, looking in the direction of arrow 3 in Fig. 2;

Fig. 4 is a view in elevation, partly in section, of the pronged member;

Fig. 5 is an end view thereof, looking in the direction of arrow 5 in Fig. 4;

Figs. 6 and 7 are enlarged detail views illustrating the locking means, and

Fig. 8 is a detail view partly in section illustrating a modification.

This invention may be applied either to a portable electric connection or to a stationary plug, such as a wall outlet. In any event, the connection will consist of a socketed member and a pronged member, the prongs of the latter entering the sockets in the socketed member in order to make the electric connection as usual. As herein illustrated, the portable type of connection is shown in order to more clearly describe the invention.

The socketed member is generally indicated at 10 and may be conventionally provided with the usual cord 12. This member is conventional in other respects also, but is provided with a novel forward laterally extending annular flange 14, which flange may be provided with a series of radially arranged notches 16.

The pronged member is generally indicated at 18 and may be provided with a conventional cord 20 in the usual way. The body portion of the member 18 may be conventional but the prongs 22 are elongated and are surrounded by a filler member 24 having an annular outwardly extending flange 26. This filler member is removably but fixedly secured to the member 18 as by screws 28. This filler member covers the usual electric connecting screws to the prongs 22 which are hidden thereby, and it is of less diameter than the member 18.

Surrounding the filler 24, there is rotatably mounted thereon a locking member having a sleeve or thimble portion 30 which rotatively bears on the outside surface of the filler member 24 and is held against longitudinal motion by means of a shoulder 32 restrained by flange 26; and the terminal portion thereof at 34 is seen to abut the forward face of the main body 18 of the pronged member.

Extending forwardly in the direction of the prongs 22, the locking member is provided with a pair of outwardly extending fingers generally indicated at 36. These fingers terminate in inwardly directed lugs or hooks 38 and these may be inserted through the notches 16 when the prongs 22 are entered in the sockets 40. A slight rotary motion of the locking member will thereby serve to lock the lugs 38 behind the flange 14 as seen in Fig. 1.

It is preferred that the lugs 38 be provided with inclined or wedge-like inner surfaces 42, so that upon the rotary motion described above, the pronged member 18 will be drawn slightly toward the socketed member 10 into tight intimate contact therewith, so that there is little or no liability of the locking member being accidentally rotated in the opposite direction to accidentally release the lugs 38 from the notches 36.

It will be seen that this invention provides a locking electrical connection which will maintain its position regardless of use of devices such as vacuum cleaners or power lawn mowers which are moved during use thereof and the same is true as to appliances which are not generally moved such as lamps, radios, etc. but in which the pronged members often become loose and accidentally detached from their base-plugs over long periods of use.

The Fig. 8 illustration shows a set of extending guides 44 on the filler 24; and the sleeve 30 is axially slidable on the filler as well as rotatable having slots 46 to accept the guides in a certain position only, wholly to align the lugs 38 with notches 16 when the prongs 22 are aligned with the sockets in member 10. Then, when the device is connected, the sleeve is slid to the left in Fig. 8 freeing the slots from the guides, and the described rotary locking action of the parts may be accomplished.

The numeral 48 in Fig. 8 represents a compressed coil spring to return the member 30 to the right, when not in use. This spring constantly urges member 30 in the direction of the arrow 50.

Having thus described my invention and the advantages thereof, I do not wish to be limited to the details herein disclosed, otherwise than as set forth in the claims, but what I claim is:

1. A safety electric connection comprising a socketed member, electric contacts therefor, a pronged member for cooperation with the socketed member to make the electric contact, a flange having radial notches on the socketed member, a cylindrical filler element surrounding the prongs on the pronged member, a flange on the filler element spaced from the pronged member, a rotatable sleeve on the filler element between the flange of the latter and the body of the pronged member and held against axial motion thereby, fingers on the sleeve extending forwardly past the filler element for entry into certain of the notches upon motion of the pronged member to insert the prongs into the sockets, and inclined surface locking lugs at the ends of the fingers, said lugs being directed radially inwardly and passing through the notches and behind the notched flange upon rotation of the sleeve relative to both the pronged and socketed members, the inclined surfaces on the locking lugs engaging the flange at the edge thereof directed away from the pronged member and axially camming the latter tightly into engagement with the socketed member.

2. An electric connection including pronged and socketed members, a cylindrical filler element on the pronged member, a rotatable and axially slidable sleeve on the filler element, guide means on the latter to constrain the sleeve against rotary motion during a part only of the axial motion thereof, interengaging lug and notch means on the sleeve and the socketed member to lock the same together upon rotary motion of the sleeve, said guide means causing alignment of the lugs and notches upon alignment of the prongs and sockets.

References Cited in the file of this patent

UNITED STATES PATENTS

| | | |
|---|---|---|
| 1,933,272 | Leuvelink | Oct. 31, 1933 |
| 2,307,423 | Savage | Jan. 5, 1943 |
| 2,633,482 | De Tar | Mar. 31, 1953 |
| 2,716,225 | McCubbin | Aug. 23, 1955 |